United States Patent Office 2,805,732
Patented Sept. 10, 1957

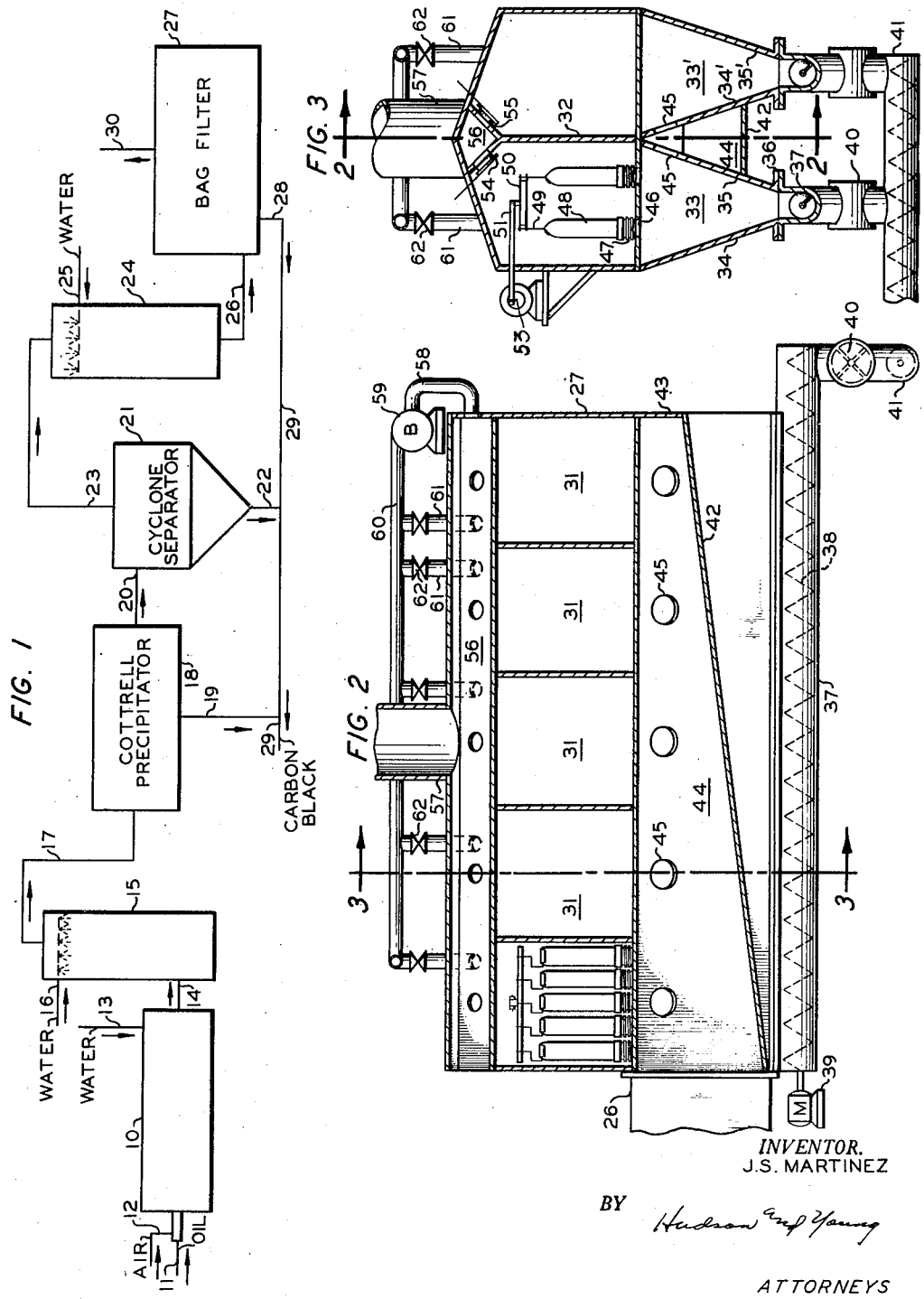

2,805,732

APPARATUS FOR FILTERING SOLIDS FROM GASES

Jesus Salinas Martinez, Borger, Tex., assignor to Phillips Petroleum Company, a corporation of Delaware Application April 18, 1955, Serial No. 501,882

6 Claims. (Cl. 183—58)

This invention relates to apparatus for filtering solids from gases. In one aspect this invention relates to filtering carbon black particles from the smoke, or hot effluent gas suspension of said carbon black, coming from a carbon black furnace.

In many industries there exists the problem of removing suspended solids from a stream of gas which is to be vented to the atmosphere. In some instances it is desirable from an economic standpoint to recover the solids. In other instances it is desirable, particularly in congested populated areas, to remove the solids from the vented gases to avoid pollution of the atmosphere. Various designs of different types of filtering equipment have been developed and are in use at the present time. One type of filtering apparatus used is that commonly called the bag filter. In a bag filter assembly the gases contained in the suspended solids are passed into a plenum chamber or inlet duct positioned below a compartment or a row of compartments containing the bag filters. The gases are passed into the inside of the bag filters which retain the suspended solids on the inner walls of said bag filters and permit the gases to pass through said walls into the bag compartment, and then into an upper plenum chamber from which the gases are vented to the atmosphere. Periodically the flow of gases through the bag filters is stopped and the bags are shaken to release deposited solids which fall into hoppers positioned below the filtering compartments.

Prior art structures of this type are usually large and of considerable height, the height being due, at least in part, to the individual solids receiving hoppers located beneath each filtering compartment. When individual hoppers are employed it is necessary to provide the hoppers with scrapers, gearmotors to drive said scrapers, and suitable valves on the discharge of each hopper. The extra height and extra equipment required when individual hoppers are employed increase construction and maintenance costs of bag filter filtering assemblies.

I have found that the above difficulties can be avoided by providing a bag filtering assembly wherein the inlet plenum chamber is positioned between and adjoining the walls of a pair of adjacent hoppers extending longitudinally below parallel rows of filtering compartments.

An object of this invention is to provide an improved apparatus for filtering solids from gases.

Another object of this invention is to provide an improved bag filter assembly for filtering suspended solids from gases wherein a common solids receiving hopper is employed for a plurality of filtering compartments, and the inlet duct or plenum chamber to said compartments is positioned between adjacent parallel solids receiving hoppers and adjoins the inner walls of said hoppers.

Another object of this invention is to provide an improved bag filter assembly having reduced construction and maintenance costs as compared with similar assemblies of the prior art.

Other aspects, objects and advantages will be apparent to those skilled in the art upon reading this disclosure.

According to the invention there is provided a bag filtering apparatus which comprises a plurality of filtering compartments arranged in adjacent parallel rows; a solids receiving hopper attached to the lower end of and extending longitudinally in a horizontal direction beneath each row of compartments; means forming an inlet plenum chamber positioned adjoining and between inner adjacent walls of said hoppers; and screw conveyor means attached to the bottom of each of said hoppers.

One industry wherein bag filters are widely used is the carbon black industry.

Figure 1 is a schematic flow diagram of a carbon black plant illustrating the use of a bag filter assembly.

Figure 2 is an elevation, partially in cross-section, taken on the line 2—2 of Figure 3, showing one-half of a bag filter assembly having 10 filtering compartments.

Figure 3 is a transverse cross-section of a bag filter assembly comprising two parallel rows of filtering compartments, the left hand row being shown along the line 3—3 of Figure 2.

Referring now to the drawings the invention will be more fully explained. Like reference numerals are employed to represent like elements. In Figure 1 there is shown a carbon black reactor 10 to which is fed a stream of oil through line 11 and a stream of air through line 12 in proper proportions. Said oil and air are introduced in a conventional manner so as to heat the vaporized oil under partial combustion conditions and crack the remaining oil to carbon black in conventional manner. While only one carbon black reactor has been shown it should be understood that a battery of several carbon black reactors can be employed. As the effluent smoke passes from the outlet end of the reactor, or reactors, 10, said smoke is quenched with a direct stream of water from line 13. Said effluent, quenched to below reaction temperature, generally to a temperature within the range of 1000–1100° F., passes through conduit 14 into secondary quenching chamber 15 wherein it is contacted with a stream of water introduced through line 16 and quenched to a desirable temperature generally within the range of 350–450° F. The resulting quenched effluent is passed via conduit 17 into Cottrell precipitator 18 wherein about 30 percent of the carbon black produced in reactor 10 is recovered and passed into conduit 19. Effluent gases from precipitator 18 is passed via conduit 20 into cyclone separator 21 wherein about 65 percent of the carbon black formed in reactor 10 is recovered and passed into conduit 22. Gaseous effluent from said cyclone separator, which in usual practice contains about 5 percent of the carbon black formed in reactor 10 is passed via conduit 23 into cooling tower 24 wherein said gaseous effluent is contacted with a stream of water introduced through line 25 and the temperature thereof lowered to about 250–260° F. The cooled gases containing suspended carbon black are passed via conduit 26 into bag filter assembly 27 (described further hereinafter) and the suspended carbon black is recovered and passed into conduit 28. As the smoke passes through the bag filters in assembly 27 substantially all of the entrained carbon black is recovered and the effluent smoke is vented to the atmosphere through line 30. Recovered carbon black from conduits 19, 22 and 28 is passed into conveyor 29 and conveyed to storage or other processing equipment not shown.

In Figures 2 and 3 there is shown a bag filter assembly, denoted generally by reference numeral 27 which comprises 10 filtering compartments 31 arranged in parallel rows of 5 compartments each. A common vertical partition 32 divides the two rows of filtering compartments. Positioned below each row of filtering compartments are solids receiving hoppers 33 and 33' defined by walls 34, 35, and 34', 35' respectively, and end walls, not shown, in the shape of a truncated-V, each hopper being attached at its inverted base to the lower end of one row of said compartments. Attached to the truncated apex of each hopper by means of a flange 36 is a conveyor trough 37. Screw conveyor 38, driven by motor 39, is positioned within said conveyor trough 37. Conveyor 38 discharges through rotary valve 40 into pneumatic conveyor 41 which conveys the recovered solids to storage, or further treatment. If desired, other conveying means such as a screw conveyor etc., can be employed instead of pneumatic conveyor 41.

Plate 42 is sealingly attached to the wall 34' of hopper 33' and wall 35 of hopper 33. Said plate 42 extends longitudinally of the filter assembly 27 and together with walls 34', 35, and closure member 43 defines an inlet plenum chamber 44 through which gases containing suspended solids from inlet conduit 26 are admitted into the filtering compartments 31. Passageways 45 and passageways 46 provide means for said gases to enter said compartments from said inlet plenum chamber. Positioned within each of said passageways 46 is a suitable conduit 47 adapted to be secured in gas tight communication with a filter bag 48. Conduit 47 can be any type of suitable conduit. A presently preferred type of conduit for this service is a flexible, extensible, gas impermeable conduit as described and claimed in the co-pending application of C. M. Kron, Serial No. 495,721, filed March 21, 1955. Other means of inserting bag 48 into passageway 46 can be employed. One such other means comprises an expandable ring fitted into the lower end of bag 48. In use the lower end of bag 48, having the compressed ring fitted therein, is inserted into passageway 46, and the ring is permitted to expand to form a gas tight connection with said passageway. Filter bags 48 are closed by folding over their upper ends and are suspended by means of hook 49 from shaker channel 50 attached to shaker bar 51 which is driven by an eccentric 53 attached to motor 52. Shaker channel 50 and shaker bar 51 are suitably mounted by means not shown so that said shaker channel can be reciprocated, in a direction perpendicular to the plane of the paper in Figure 2, by means of eccentric 53.

Filter bags 48 can be woven from any suitable fabric depending upon the service in which they are to be employed. A presently preferred type of material for filtering smoke from a carbon black furnace is the polyacrylonitrile synthetic fiber available on the open market under the registered trademark "Orlon." Glass fiber bags can also be employed but are not presently preferred.

Slide valves 54 attached to conduit outlets 55 provide means of egress for the clean gases from the compartments into upper plenum chamber 56 from which said gases are vented to the atmosphere through stack 57. Conduit 58, blower 59, conduit 60 and conduits 61 having valves 62 therein provide means for compressing a portion of the gases from said plenum chamber 56 and returning same to a selected compartment 31 during shaking operations (described hereinafter) so as to increase the pressure on the outside of bags 48 and thereby facilitate discharge of deposited solids from said bags.

It is to be noted that the inlet plenum chamber 44 is positioned between and adjoins hoppers 33 and 33'. The adjacent walls 35 and 34' of hoppers 33 and 33' respectively form two walls of inlet plenum chamber 44. The third wall or bottom of said plenum chamber is formed by plate 42. In a preferred embodiment plate 42 extends longitudinally of said hoppers and upwardly from the point where inlet conduit 26 attaches to said inlet plenum chamber 44 and thus provides a plenum chamber of decreasing cross section in the direction of flow. Thus, at the upstream end of the filtering assembly where the volume of gas is largest the cross sectional area is largest and as said gases progress downstream, with successive portions thereof entering compartments 31, the volume of said plenum chamber is decreased to compensate for the decrease in volume of said gases and thereby cause the inlet pressure to all compartments 31 to be substantially the same.

This manner of constructing bag filter assemblies has several advantages over prior art construction. In the prior art, bag filter assemblies, as mentioned, were usually constructed with individual hoppers below each filtering compartment. The inlet plenum chamber was generally placed between the hoppers but was not integral with the walls of said hoppers. In other words, the plenum chamber formed a completely separate conduit. When using my manner of construction the individual hoppers below each filtering compartment are eliminated. With the elimination of the individual hoppers the scrapers in each hopper, the motors necessary to drive said scrapers, and valves on the outlet of each hopper are also eliminated. As will be understood by those skilled in the art the elimination of the individual hoppers together with their accompanying scrapers etc. results in very substantial monetary savings in construction costs.

It is unnecessary to employ scrapers in the hoppers of my filtering assembly because, due to the two wall construction, solids deposited in the hopper do not bridge over as they do in an individual hopper having either four walls each sloping to a common point or a wall of substantially conical shape.

A further advantage in my manner of construction is the reduction of over-all height of the filter assembly. Filter assemblies constructed in accordance with my invention can be of from 10 to 20 feet less height than filter assemblies constructed according to the prior art. This also results in substantial monetary savings in construction costs.

Another advantage in my bag filter assembly when a stream of hot gases is to be filtered, as in carbon black manufacture, is the reduction in insulation costs. Since two sides of the inlet plenum chamber are integral with the adjacent walls of the parallel hoppers it is necessary to insulate only the bottom side of said plenum chamber. Furthermore, it is not necessary to insulate that portion of the adjacent hopper sides which are integral with said plenum chamber. This not only reduces initial construction costs but reduces maintenance costs as well because the insulation must be maintained. When individual hoppers and a separate plenum chamber are employed it is necessary to insulate all sides of all hoppers and all sides of said plenum chamber.

In operation, as applied to a carbon black plant, the effluent gases from conduit 26 containing about 5 percent of the carbon black formed in reactor 10 are introduced into the upstream end of inlet plenum chamber 44. Said gases containing the suspended carbon black are passed through passageways 45 into the upper portion of hoppers 33 and 33' from where they pass through passageways 46 and conduits 47 into the inside of bags 48. Bag 48 retains the suspended solids allowing the gases to pass therethrough into the filtering compartment 31 surrounding said bags. Clean gases are passed through slide valves 54 and conduits 55 into plenum chamber 56 and are vented to the atmosphere through stack 57.

In continuous operation it is necessary, periodically, to discharge collected solids from the inside of bags 48. When this is necessary it is accomplished by first closing the valve 54 on the outlet from the filter compartment containing the bags to be cleaned, thus stopping flow of gases into the compartment. Closing of valve 54 will stop the flow of gases into the effected compartment by causing the pressure drop into the remaining compartments, where the valves 54 are open, to be greater. Blower 59 takes suction via conduit 58 on the clean gases in upper plenum chamber 56 and returns the compressed gases via conduits 60 and 61 to the compartment 31 which has been taken out of service. This increases the pressure on the outside of bags 48 and aids in releasing the deposited material from the inside of said bags. Simultaneously with this pressuring operation bags 48 are shaken by the shaker means previously described. In carbon black manufacture it is generally desirable to shake the bags in each compartment about 15 seconds in about each 15 minutes of operation. It will, of course, be understood by those skilled in the art that the duration and frequency of the shaking period will vary with the type of material being filtered and the concentration of the solids suspended in the gases.

While the invention has been described as particularly applied to carbon black manufacture it should be understood that it is not so limited. Filter assemblies constructed in accordance with my invention can be used in filtering other suspended solids from gases.

As will be evident to those skilled in the art various modifications of the invention can be made, or followed, in the light of the foregoing disclosure and discussion, without departing from the spirit or scope of said disclosure or from the scope of the claims.

I claim:

1. Bag filtering apparatus which comprises: a plurality of filtering compartments arranged in adjacent parallel rows; a common hopper for each row of compartments, each said hopper being attached to the lower end of and extending longitudinally in a horizontal direction beneath each said row of compartments; means forming a longitudinally extending inlet plenum chamber positioned adjoining and between the inner adjacent longitudinal walls of said hoppers; and screw conveyor means attached to the bottom of each of said hoppers.

2. Bag filtering apparatus which comprises: a plurality of filtering compartments arranged in adjacent parallel rows; a common hopper for each row of compartments, each said hopper being attached to the lower end of and extending longitudinally in a horizontal direction beneath each said row of compartments; a longitudinally extending plate sealingly engaged to the longitudinal inner walls of adjacent hoppers so as to form a longitudinally extending inlet plenum chamber between and adjoining said inner adjacent longitudinal walls of said hoppers; a conveyor trough attached to the lower end of each of said hoppers; and a screw conveyor operatively positioned in each of said conveyor troughs.

3. Bag filtering apparatus which comprises a plurality of filtering compartments having a common inner vertical partition and arranged in two adjacent parallel rows; a truncated V-shaped common hopper for each row of compartments, each said hopper being attached to the lower end of and extending longitudinally in a horizontal direction beneath each said row of compartments, each of said hoppers having a longitudinal inner wall and a longitudinal outer wall, said inner walls of said hoppers being adjacent each other; a plate sealingly engaged to said adjacent inner walls of said hoppers and extending in a longitudinal direction between said hoppers so as to form a triangular shaped longitudinally extending inlet plenum chamber between said adjacent longitudinal inner walls; a conveyor trough attached to the truncated portion of each of said hoppers; and a screw conveyor operatively positioned in each of said conveyor troughs.

4. Bag filtering apparatus which comprises, in combination: a plurality of filtering compartments having a common inner vertical partition and arranged in two adjacent parallel rows; a truncated V-shaped common hopper for each row of compartments, each said hopper being attached to the lower end of and extending longitudinally in a horizontal direction beneath each row of compartments, each of said hoppers having a longitudinal inner wall and a longitudinal outer wall, said inner walls of said hoppers being adjacent each other; at least one filter bag in each of said compartments; a plate sealingly engaged to said adjacent inner walls of said hoppers and extending in a longitudinal direction between said hoppers so as to form a longitudinally extending triangular shaped inlet plenum chamber between an integral with said inner walls; an inlet conduit connected to the inlet of said plenum chamber; a passageway in each of said inner walls from said plenum chamber into each of said hoppers; outlet means from said hoppers into said bags in each of said filter compartments; outlet means from each of said filter compartments; vibratory means for shaking said bags; a conveyor trough attached to the truncated portion of each of said hoppers; and a screw conveyor operatively positioned in each of said conveyor troughs.

5. Bag filtering apparatus which comprises, in combination: a plurality of filtering compartments having a common inner vertical partition and arranged in two adjacent parallel rows; a truncated V-shaped common hopper for each row of compartments, each said hopper being attached to the lower end of and extending longitudinally in a horizontal direction beneath each row of compartments, each of said hoppers having a longitudinal inner wall and a longitudinal outer wall, said inner walls of said hoppers being adjacent each other; a plate sealingly engaged to said adjacent inner walls of said hoppers and extending in a longitudinal direction between said hoppers so as to form a longitudinally extending triangular-shaped inlet plenum chamber defined by said plate and said inner walls; an inlet conduit connected to the inlet of said plenum chamber; a passageway in each of said inner walls from said plenum chamber into each of said hoppers at a point positioned below each filtering compartment; outlet means from said hoppers into each of said filtering compartments; outlet means from each of said filtering compartments; a conveyor trough attached to the truncated portion of each of said hoppers; and a screw conveyor operatively positioned in each of said conveyor troughs.

6. Bag filter apparatus which comprises, in combination: a plurality of filtering compartments arranged in adjacent parallel rows; a common hopper for each row of compartments, each said hopper being attached to the lower end of and extending longitudinally in a horizontal direction beneath each said row of compartments; a longitudinally extending plate sealingly engaged to the longitudinal inner walls of adjacent hoppers so as to form a longitudinally extended triangular shaped inlet plenum chamber positioned adjoining and between said inner adjacent longitudinal walls of said hoppers; and screw conveyor means attached to the bottom of each of said hoppers.

References Cited in the file of this patent

UNITED STATES PATENTS

| 470,970 | Bartlett | Mar. 15, 1892 |
| 1,109,997 | Lob | Sept. 8, 1914 |
| 2,717,054 | Petersen | Sept. 6, 1955 |

FOREIGN PATENTS

| 1,215 | Great Britain | Jan. 16, 1912 |
| 27,413 | Netherlands | July 15, 1932 |